(12) United States Patent
Titen

(10) Patent No.: US 11,642,587 B2
(45) Date of Patent: May 9, 2023

(54) SYSTEM FOR ALIGNING SHOULDERS AND SPINE FOR SPORTS TRAINING

(71) Applicant: LJR Business Consultants, Inc., Saint Petersburg, FL (US)

(72) Inventor: Edward M. Titen, Saint Petersburg, FL (US)

(*) Notice: Subject to any disclaimer, the term of this patent is extended or adjusted under 35 U.S.C. 154(b) by 737 days.

(21) Appl. No.: 16/206,880

(22) Filed: Nov. 30, 2018

(65) Prior Publication Data
US 2019/0201773 A1 Jul. 4, 2019

Related U.S. Application Data

(60) Provisional application No. 62/667,127, filed on May 4, 2018, provisional application No. 62/592,866, filed on Nov. 30, 2017.

(51) Int. Cl.
*A63B 71/06* (2006.01)
*A41D 1/04* (2006.01)
(Continued)

(52) U.S. Cl.
CPC ............ *A63B 71/0622* (2013.01); *A41D 1/04* (2013.01); *A63B 24/0062* (2013.01); *A63B 69/3608* (2013.01); *G06T 7/20* (2013.01); *G09B 19/0038* (2013.01); *A41D 2600/10* (2013.01); *A63B 24/0006* (2013.01); *A63B 69/00* (2013.01); *A63B 2071/0625* (2013.01);
(Continued)

(58) Field of Classification Search
CPC ............ A63B 71/0622; A63B 69/3608; A63B 24/0062; A63B 2225/74; A63B 2220/806; A63B 2210/52; A63B 2220/805; A63B 2220/34; A63B 2220/40; A63B 2209/10; A63B 2071/0647; A63B 2220/18; A63B 69/00; A63B 2220/10; A63B 2225/54; A63B 2071/0627; A63B 2071/0638; A63B 2225/09; A63B 2225/68; A63B 24/0006; A63B 2220/13; A63B 2220/16; A63B 2071/0625; A63B 2209/00; A63B 2220/803; A63B 2220/807; A63B 2225/50; A63B 2220/836; A63B 2214/00; G06T 7/20; G09B 19/0038; A41D 1/04; A41D 2600/10
See application file for complete search history.

(56) References Cited

U.S. PATENT DOCUMENTS

| | | | | |
|---|---|---|---|---|
| 6,035,452 A | * | 3/2000 | Braxton | A41D 13/0518 2/24 |
| 6,206,787 B1 | * | 3/2001 | Kleppen | A63B 69/0059 473/212 |
| 8,708,834 B1 | * | 4/2014 | Domangue | A63B 69/3608 473/215 |
| 9,687,378 B1 | | 6/2017 | Titen | |

(Continued)

*Primary Examiner* — Jeffrey S Vanderveen
(74) *Attorney, Agent, or Firm* — IPkey PLLC

(57) ABSTRACT

Posture training systems provide hands-free shoulder and back\spine alignment assistance for facilitating correct posture and alignment of the shoulders and spine of an athlete throughout swing or other physical rotational movements, and methods of their use. The posture training systems include vests that provide information during and throughout the rotational movement about spine-tilt angle relative to the ground, plane of the shoulders during torso rotation, perpendicularity between the spine and a line drawn between the shoulders, as well as departures from or maintenance of any of the initial parameters.

15 Claims, 14 Drawing Sheets

(51) Int. Cl.
*A63B 69/36* (2006.01)
*A63B 24/00* (2006.01)
*G06T 7/20* (2017.01)
*G09B 19/00* (2006.01)
*A63B 69/00* (2006.01)

(52) U.S. Cl.
CPC ............. *A63B 2071/0627* (2013.01); *A63B 2071/0638* (2013.01); *A63B 2071/0647* (2013.01); *A63B 2209/00* (2013.01); *A63B 2209/10* (2013.01); *A63B 2210/52* (2013.01); *A63B 2220/10* (2013.01); *A63B 2220/13* (2013.01); *A63B 2220/16* (2013.01); *A63B 2220/18* (2013.01); *A63B 2220/34* (2013.01); *A63B 2220/40* (2013.01); *A63B 2220/803* (2013.01); *A63B 2220/805* (2013.01); *A63B 2220/806* (2013.01); *A63B 2220/807* (2013.01); *A63B 2220/836* (2013.01); *A63B 2225/09* (2013.01); *A63B 2225/50* (2013.01); *A63B 2225/54* (2013.01); *A63B 2225/68* (2013.01); *A63B 2225/74* (2020.08)

(56) References Cited

U.S. PATENT DOCUMENTS

| | | | | |
|---|---|---|---|---|
| 2003/0060341 | A1* | 3/2003 | Brasel | A63B 21/0023 482/91 |
| 2006/0166737 | A1* | 7/2006 | Bentley | G09B 19/0038 463/43 |
| 2008/0026351 | A1* | 1/2008 | Thompson | G09B 19/0038 434/251 |
| 2011/0043755 | A1* | 2/2011 | Gibson-Horn | A61F 5/026 351/203 |
| 2013/0333093 | A1* | 12/2013 | Storelli | A63B 71/148 2/161.1 |
| 2015/0306454 | A1* | 10/2015 | Winbush | A63B 23/0405 482/13 |
| 2016/0059063 | A1* | 3/2016 | Breibart | A63B 21/4007 482/123 |
| 2016/0199693 | A1* | 7/2016 | Vermilyea | A61B 5/1122 700/91 |
| 2017/0028244 | A1* | 2/2017 | Schreiber | A63B 21/4007 |
| 2017/0102215 | A1* | 4/2017 | Castrati | A45F 3/14 |
| 2017/0106223 | A1* | 4/2017 | Brancato | A63B 21/0557 |
| 2017/0291058 | A1* | 10/2017 | Marji | A63B 23/03516 |

* cited by examiner

SYSTEM FOR ALIGNING SHOULDERS AND SPINE FOR SPORTS TRAINING

CROSS-REFERENCE TO RELATED APPLICATIONS

This application claims the benefit of U.S. Provisional Patent Application Nos. 62/592,866, filed Nov. 30, 2017, and 62/667,127, filed May 4, 2018, both of which are incorporated herein by reference in their entireties.

BACKGROUND

The present disclosure relates to a new class of systems for aligning the shoulders and spine of a user, e.g., an athlete. Such systems include posture training systems and methods for using such systems. The systems provide hands-free shoulder and back\spine alignment assistance to correct initial sports posture by athletes. The systems further assist the athlete with alignment of the shoulders and spine throughout swing or other rotational movements. More particularly, this disclosure relates to training vests that provide information about spine-tilt angle relative to the ground, plane of the shoulders during torso rotation, and perpendicularity between the spine and a line drawn between the shoulders (or shoulder blades).

In a significant number of sports or related physical activities such as golf, tennis, racquetball, hockey, baseball, softball, lacrosse, track and field events such as javelin and shotput, gymnastics, figure skating and/or artistic dance (such as ballet, jazz, or modem), correct posture during and/or throughout rotational movements is paramount to ultimate success.

Correct posture in a particular physical movement requires establishing proper spine-tilt angle relative to the ground, plane of the shoulders during torso rotation, and/or maintenance of perpendicularity between the spine and a line drawn between the shoulders.

Certain prior art posture devices are directed to other ends, such as improving typical standing or upright posture of a human or in aiding a human in recovery efforts from back related injuries or surgery. Other prior art posture devices focus on helping an athlete resist torsional movement or arching by keeping the back rigid to minimize lower back strain. These devices are ill suited for use with sports requiring rotational movements by athletes, because they become overly restrictive and/or uncomfortable to use. In addition, these prior art posture devices generally lack any provision of feedback to the athlete during their use that could help the athlete sense the "look" and "feel" of correct movements.

Other prior art posture devices attempt to address only one of the alignment parameters of spine-tilt angle, shoulder plane during torso rotation, and spine perpendicularity during physical movement, while leaving the other two parameters, or the interrelationship of the parameters, unassessed. Still other prior art posture devices are unwieldy, costly and/or too complex for the typical enthusiast to routinely purchase or readily employ.

Still other prior art devices do not address changes in posture during athletic movement, and fail to provide accurate information about spine-tilt angle, shoulder plane during torso rotation, and/or maintenance of spine/shoulder perpendicularity relative to that established at onset of the movement. Thus, the devices fail to provide the type of information that is truly important, that is, accurate positional data throughout the physical movement from start to finish. Prior art posture devices also generally lack an ability to be used in conjunction with other electronic systems capable of actively measuring one or more physical parameters of the athlete or objects being interacted with by the athlete in the practice of the sport or activity.

The failure of prior art devices to appreciate the interplay between spine-tilt, shoulder plane, and spine/shoulder perpendicularity and their synergistic impact on overall performance significantly limits potential improvements in an athlete's technique, and, it follows, his or her ultimate skills in and overall enjoyment of the sport or activity.

Accordingly, athletes are unable to readily assess their posture from start to finish with prior art posture devices, to identify ways to improve their performance of those movements and, ultimately, to increase their enjoyment of the activity. The presently disclosed athlete posture training systems resolve or reduce the drawbacks associated with existing posture devices.

SUMMARY

This summary is provided to introduce a selection of concepts in a simplified form that are further described below in the Detailed Description. This summary is not intended to identify key features of the claimed subject matter, nor is it intended to limit the scope of the claimed subject matter.

These training systems and their related methods of use are designed for improving both initial posture and maintenance of initial or correct posture during sports movements in a wide range of sports activities. They provide feedback in use to the athlete that may help the athlete sense the "look" and "feel" of correct movements. In addition, they allow the athlete total freedom of movement during actual sport-related activity. Consequently, vests of the presently disclosed training systems are comfortable in use and amenable to use in both solo and observed training sessions. The vests are inexpensive to manufacture from readily available materials.

When an athlete wears the vest, it allows him or his trained observer to assess posture from beginning to end by observing the alignment parameters of spine-tilt angle, shoulder plane during torso rotation, and spine perpendicularity during physical movement. While the particular sport or movement defines the desired spine-tilt angle relative to ground and/or the particular plane of shoulders during the movement, the need to readily discern or visualize the alignment parameters during the actual movement is useful to analysis of any of these rotational movements. The vest is readily adapted to use in any number of athletic movements. By employing the vest in training sessions, the athlete can readily see at what points during the movement his posture strays from ideal, and identify changes needed to maintain spine-tilt angle, shoulder plane during torso rotation and spine/shoulder perpendicularity. The horizontal rods extend sufficiently so that the athlete has them within his peripheral vision, which allows the athlete to observe or visualize the shoulder plane during torsional rotation. The vertical rods assist the athlete and the observer in observing changes in spine-tilt angle during movements.

These observations assist the athlete or trainer in identifying which movements require modification to perfect technique and/or create feel or muscle memory. And all of this can be carried out while training is in session to maximize technique improvement opportunities for the athlete. The ability to attach a lightweight non-movement-restricting training vest during the actual physical movement becomes invaluable as a tool because it allows immediate feedback from an observer or by the athlete that can translate to movement modification and learned "look" and "feel" of the proper technique once the athlete and his training vest have been visualized together during the movement of interest. Moreover, the ability to utilize such a device in conjunction with systems that are capable of actively measuring one or more physical parameters of the athlete (spin rate, wobble or center of gravity, for example) or of the object being interacted with or acted upon by the athlete, such as a ball, club or racket.

This disclosure sets forth hands-free shoulder and back\spine alignment posture training systems that include vests for correcting both initial posture and alignment of the shoulders and spine of an athlete throughout swing or other rotational movements by bringing attention to changes in key parameters. These parameters include spine-tilt angle relative to the ground, plane of the shoulders during torso rotation, and maintenance of perpendicularity between the spine and a line drawn between the shoulders (or shoulder blades. This disclosure also sets forth hands-free shoulder and back\spine alignment training vests that indicate or identify improper alignment throughout athlete motion and any posture or movements that may require correction.

The athlete training vests include a chest panel, a back panel having vertical and horizontal passageways, each useful for holding at least one rod in place (e.g., two rods or four rods), and four adjustable straps, which are at least in part elastomeric. The back panel's vertical passageway holds at least one rod inserted lengthwise, such that the ends of the vertical rod extend sufficiently beyond the back panel that they are visible to an observer while the vest is worn by an athlete. The upper end of the vertical rod may also be visible to the athlete. The back panel's horizontal passageway holds at least one rod inserted lengthwise, such that the ends of the horizontal rod(s) extend sufficiently beyond the back panel that they are peripherally visible to the athlete while he is wearing the vest. The vertical passageway and its rod(s) are independent of the horizontal passageway and its rod(s). The crossing of the vertical and horizontal rods defines four areas of the back panel. An adjustable strap is attached to the back panel at each of the four areas, i.e., four straps (some embodiments may have additional straps). Each of these straps is reversibly attached to one of four corresponding straps attached to the chest panel. At least a portion of one or more of the chest panel straps is made of an elastomeric material.

The adjustability and/or elastomeric nature of the four sets of straps provides both comfort and a customized fit for any athlete wearing the vest. These straps also enable the vest to maintain its initial positioning on an athlete during the sport movement being evaluated.

This disclosure also sets forth methods for improving an athlete's posture by providing a training vest as disclosed herein to an athlete, positioning the training vest on the athlete, having the athlete establish an initial position for a sports related movement, and carrying out the movement while visualizing the movement of at least one of the rods. These methods can be enhanced by relating the rod movement to spine-tilt angle relative to the ground, the plane of the shoulders during torso rotation or maintenance thereof, including the plane during rotation with respect to the longitudinal axis of the wearer's spine, and maintenance of perpendicularity between the spine and a line drawn between the shoulders.

Certain other methods set forth further include adjusting the physical movement based on the analysis; and thereafter having the athlete perform the adjusted physical movement.

Methods for creating muscle memory for consistently repeating an optimized physical movement in the later absence of the training vests are also set forth herein. These methods include iteratively carrying out the steps of the methods disclosed herein until the movement is consistent and repeatable in the absence of the training vest.

While simple video imaging or multiple photographs by an observer will assist the athlete to analyzing swing geometries, the disclosed training vest lends itself particularly well to use in conjunction with any of the more recently developed computer and/or video swing evaluation systems, such as for example, TRACKMAN® golf systems, that track what the club does before, during, and after impact as well as ball flight after impact, while employing video to review posture and correlate changes in posture to fundamental parameters of ball flight.

Employing the presently disclosed training vest in conjunction with such systems enhances the ability to analyze swing geometries and stance at any time during swing by reviewing video trained on the athlete and comparing how well the athlete maintains proper shoulder plane and spine angle during the swing. Corrections to angle and plane in subsequent swings and ball movement resulting from contact, for example, with a golf club, then gives rise to additional analytical measurements made by an accompanying swing tracking system to provide immediate feedback to the athlete on improvements. This immediacy of feedback has the benefit of creating situations where the athlete can experience proper swing "feel" and develop "muscle memory" of this correct positioning and accelerate skills development during even short training sessions with a qualified instructor. Accordingly, the disclosure also relates to systems for training that include any of the disclosed training vests and any of a number of computer and/or video swing evaluation systems, as well as training methods that employ the training vest alone or in connection with training systems wherein the training vests are used in combination with computer and/or video swing evaluation systems, virtual reality systems, and augmented reality systems, including systems that utilize video and motion cameras.

Certain embodiments of the present disclosure are directed to sports training vests comprising a back panel having two perpendicularly directed passages disposed therethrough, and having straps attached to the back panel, a chest panel having elastomeric straps attached thereto, the elastomeric straps configured to reversibly attach to the straps of the back panel, and rods supported within the two passages and visibly extending therefrom; where in use, the training vest is worn such that the rods are oriented vertically and horizontally and the elastomeric straps provide tension to maintain the positioning of the training vest on the athlete's body during swing movements.

Other embodiments of the present disclosure are directed to training vests that include a back panel having a passageway through a vertical axis of the back panel and a passageway through a horizontal axis of the back panel, wherein the vertical and horizontal passageways define first, second, third and fourth areas of the back panel; a first rod extending through the vertical passageway and a second rod extending through the horizontal passageway, such that a portion of the first rod extends beyond the vertical passageway and a portion of the second rod extends beyond the horizontal passageway; and a chest panel having attached elastomeric straps configured to reversibly attach to adjustable straps attached to the back panel, wherein the chest panel in conjunction with its attached elastomeric straps is configured to maintain initial positioning of the training vest on the athlete's anatomy during swing movements.

Other embodiments of the disclosure are directed to methods of use of the disclosed training vests to correct or improve posture and alignment of the shoulders of an athlete during physical movements in sports or other related activities. These methods include: providing the disclosed training vest or system including the training vest, positioning the training vest on an athlete, having the athlete wearing the training vest establish an initial position for analyzing the physical movement, and thereafter conducting the physical movement while visualizing the movement. In some embodiments, the methods further comprise analyzing certain parameters include spine-tilt angle relative to the ground, plane of the shoulders during torso rotation, and maintenance of perpendicularity between the spine and a line drawn between the shoulders (or shoulder blades). In yet other embodiments, the methods further include adjustments to the physical movement based on the visualized parameters relative to certain pre-established parameters, and thereafter performing the adjusted physical movement, optionally visualizing, analyzing performance of the visualized parameters and modifying the movement as required in a repetitive process. In certain embodiments, this defines a method for creating muscle memory or feel of the correct posture for consistently repeating an optimized physical movement.

The foregoing and other objectives, features, aspects, and advantages of the present disclosure will be more readily understood upon consideration of the following detailed description, figures and claims.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings and appendix, wherein:

FIG. 7b shows another aspect of the sectioned and/or shock-corded rod of FIG. 7a.

FIG. 7c shows another aspect of the sectioned and/or shock-corded rod of FIG. 7a.

DETAILED DESCRIPTION

As employed above and throughout the present disclosure, the following terms shall have the following meanings.

"Shoulder plane" refers to an imaginary plane created by a line extending from the left shoulder or shoulder blade to the corresponding right shoulder or shoulder blade, as a training vest wearer rotates his torso about a longitudinal axis of the wearer's spine during a rotational movement of interest.

"Shoulder alignment" and "shoulder and back/spine alignment" each refers to the relationship of the shoulder plane with respect to the spine or a longitudinal axis of the spine (which may be typically viewed as represented by the vertical rod of the training vest).

"Correct shoulder alignment" and "shoulder and back/spine alignment" each refers to the relationship of the shoulder plane as defined herein with respect to the longitudinal axis of the spine wherein the longitudinal axis of the spine or its representative, the vertical rod of the training vest, is perpendicular to the shoulder plane.

Figure 2:
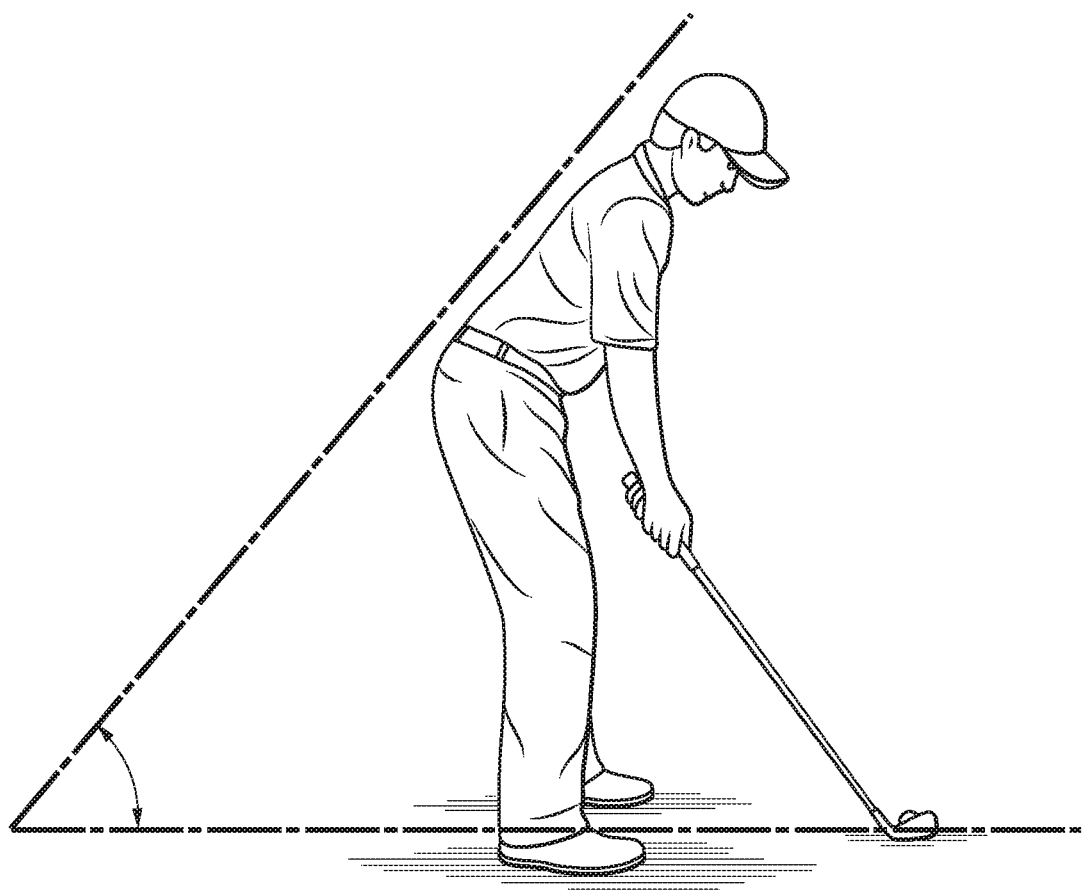
FIG. 2 is an illustration of a spine-tilt angle imposed on an illustration of a golfer at ball address.

"Spine-tilt angle" refers to the angle formed when an imaginary line representing the longitudinal axis of the spine intersects a plane represented by a horizontal plane upon which the wearer is positioned during the rotational movement. An exemplary plane is the ground that a golfer stands on while addressing a golf ball, as seen in FIG. 2.

"Torso rotation" refers to the movement of a training vest wearer pivots his upper body (or torso) about a longitudinal axis representing the wearer's spine during a rotational movement of interest.

"Muscle memory" refers to the ability to reproduce a particular movement without conscious thought, acquired as a result of frequent repetition of that movement.

"Spine perpendicularity" refers to the relationship of the longitudinal axis of the spine relative to a line drawn between the shoulders or the shoulder blades of a person.

The present disclosure relates to a new class of training vests that provides hands-free shoulder and back\spine alignment training to facilitate correct posture and alignment of the shoulders and spine of an athlete throughout swing or other rotational movements, and method of their use. More particularly, this disclosure relates to training vests that provide information about spine-tilt angle relative to the ground, plane of the shoulders during torso rotation, and perpendicularity between the spine and a line drawn between the shoulders (or shoulder blades), as well as departures from or maintenance of any of the initial parameters during and throughout the rotational movement.

The following detailed description and the appended drawings describe and illustrate some embodiments of the disclosure for the purpose of enabling one of ordinary skill in the relevant art to make and use these embodiments. As such, the detailed description and illustrations of these embodiments are purely illustrative in nature and are in no way intended to limit the scope of the disclosure in any manner. It should also be understood that the drawings are not necessarily to scale and, in certain instances, details may have been omitted, which are not necessary for an understanding of the embodiments, such as details of fabrication and assembly. In the accompanying drawings, like numerals represent like components.

Certain embodiments of the present disclosure are directed, in part, to posture training systems that include sports training vests, the vests comprising a back panel having two perpendicularly directed passages disposed therethrough, and having straps attached the back panel, a chest panel having elastomeric straps attached thereto, the elastomeric straps configured to reversibly attach to the straps of the back panel, and rods supported within the two passages and visibly extending therefrom; where in use, the training vest is worn such that the rods are oriented vertically and horizontally and the elastomeric straps provide tension to maintain the positioning of the training vest on the athlete's body during swing movements.

Other embodiments of the present disclosure are directed, in part, to training vests that include a back panel having a passageway through a vertical axis of the back panel and a passageway through a horizontal axis of the back panel, wherein the vertical and horizontal passageways define first, second, third and fourth areas of the back panel; a first rod extending through the vertical passageway and a second rod extending through the horizontal passageway, such that a portion of the first rod extends beyond the vertical passageway and a portion of the second rod extends beyond the horizontal passageway; and a chest panel having attached elastomeric straps configured to reversibly attach to adjustable straps attached to the back panel, wherein the chest panel in conjunction with its attached elastomeric straps is configured to maintain initial positioning of the training vest on the athlete's anatomy during swing movements.

PARTS LIST

10 Training vest
12 Back panel
14 Chest panel
16 Outer layer
18 Outer layer
20 Insert
22 Mesh
24 Passageway
26 Passageway
28 Rod
30 Rod
32 Rod end
34(*a-d*) Back panel straps (four in total)
36(*a-d*) Clip or attachment portions (four in total)
38(*a-d*) Clip or attachment portions (four in total)
40(*a-d*) Chest panel straps (four in total)
42 Attachment strip
44 Pouch
46 Strap
48 Strap end
50 Closure
52 Strap
54 Rod
56 Rod
58 Sensor
60 Power Supply
70 Controller
80 Processor
90 Storage Medium
100 Transponder/Transceiver
110 Module The posture training systems of the present disclosure generally include a vest 10. In any of the disclosed posture training system embodiments, including the exemplary vest embodiments illustrated with the assistance of FIGS. 3-11, a back panel 12 and a chest panel 14 may each independently be constructed from any appropriate material that does not interfere with golf swing or maintenance of training vest positioning. Typically, the back panel 12 and/or chest panel 14 independently has a first outer layer 16 and a second outer layer 18 constructed of durable fabric such as heavy grade nylon canvas or ripstop nylon. Insert 20 is disposed between the two outer layers 16, 18 and provides added integral strength to the chest panel 14 or back panel 12 and/or assists in the anchoring of the straps attached to the chest panel 14 or back panel 14. Exemplary materials for the insert 20 include rigid plastic mesh (shown as 22) such as DARICE® canvas designer sheets (like those commonly found in arts and crafts stores). Mesh size of the plastic sheet may vary. For example, an embodiment may utilize a seven mesh sheet for this purpose. The two outer layers (16, 18) and insert 20 may be held together by gluing, sewing, and/or other joining means, so long as the method of connecting them together resists separation under the normal stresses associated with using the training vest 10 for its intended purposes. Independent perpendicularly affixed passageways 24, 26 within the back panel 12 are useful to minimize contact between the rods 28, 30 while allowing them to be positioned within or proximate a plane of the back panel 12.

Figure 3:
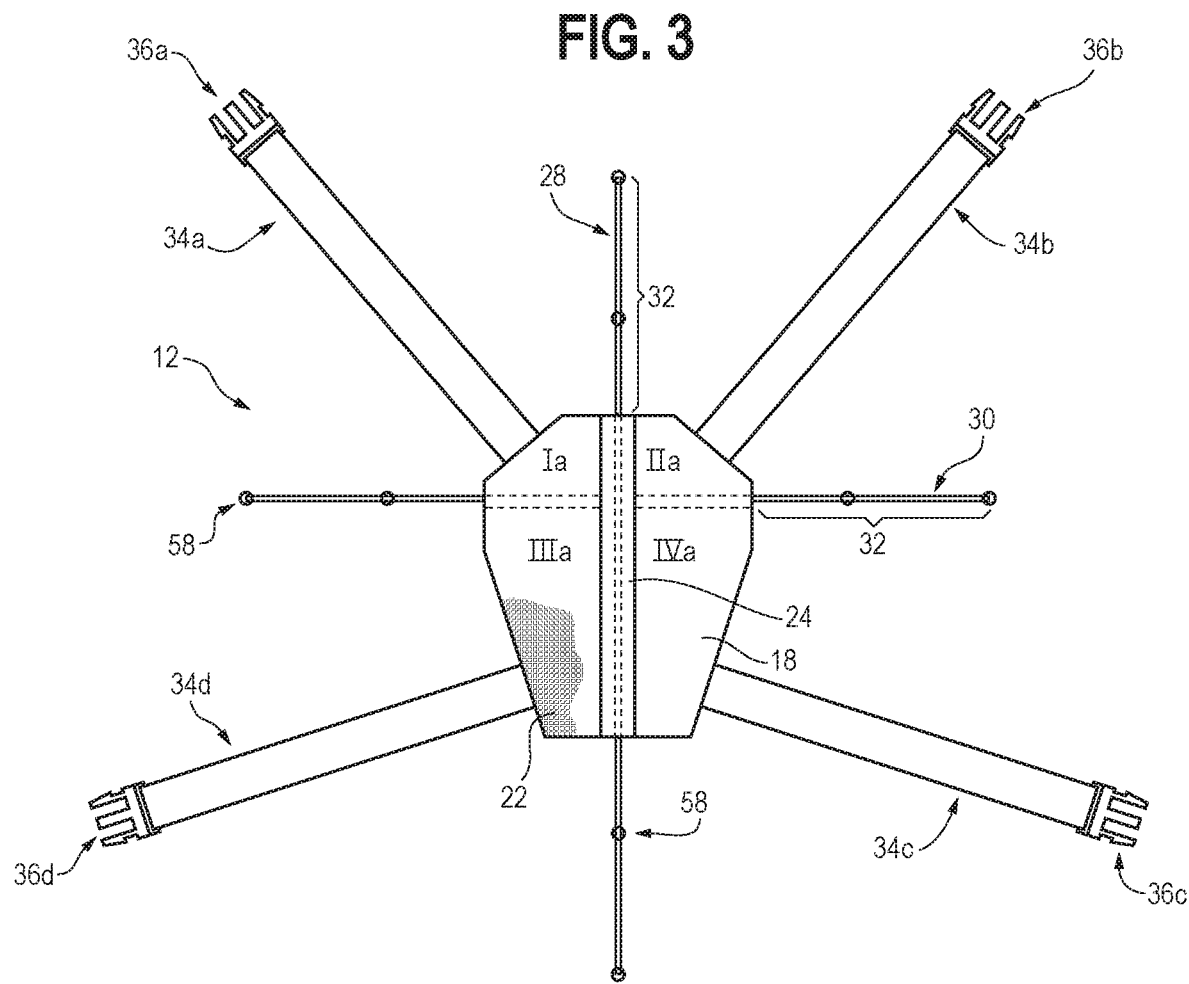
FIG. 3 is an exemplary view of an underside of the back panel of a vest of a presently disclosed posture training system.

FIG. 3 illustrates an embodiment of an inside view of the back panel 12 (the side of the back panel that is proximate to the athlete's back) of the present disclosed training vest 10. Perpendicular rods 28 and 30 are shown disposed respectively through vertical passageway 24 and horizontal passageway 26 (not shown), exposing each rod at both of its ends 32 for visualization by the athlete or other observer. In an embodiment, the system may include more than two rods, e.g., four rods. For example—referring still to FIG. 3—rather than a single rod 28 extending vertically through the vertical passageway 24, a first rod may extend partially into the vertical passageway 24 and protrude upwardly outward therefrom, and a second rod may extend partially into the vertically passageway 24 and protrude downwardly outward therefrom. Likewise, rather than a single rod 30 extending horizontally through the horizontal passageway 26, a third rod may extend partially into the horizontal passageway 26 and protrude leftwardly outward therefrom, and a fourth rod may extend partially into the horizontal passageway 26 and protrude rightwardly outward therefrom. With the foregoing potential variations in mind, the application shall describe the posture training systems in terms of a single vertical rod 28 and a single horizontal rod 30 for ease of communication.

In addition, FIG. 3 illustrates four straps 34(*a-d*), one each attached to one of the four areas defined by the intersecting of the x-axis and y-axis defined by the two passageways (24, 26). Each of the straps includes a clip or other attachment portion 36(*a-d*) that corresponds to a clip or other attachment portion 38(*a-d*) on one of the straps attached to the chest panel 14. In certain embodiments, each of the back panel straps 34(*a-d*) is designed to connect with a corresponding chest panel strap 40(*a-d*) in the chest panel area via the clip or attachment portions. This configuration creates an "across-the-chest" stabilizing system that assists in maintaining, during and throughout the rotational movement of interest, the positioning of the training vest at onset of that rotational movement.

Exemplary clips that comprise first and second clip portions 36(*a-d*) and 38(*a-d*) respectively, include buckles, such as those commonly referred to as "parachute buckles." The clip size may vary, and may correspond to the width of the strap to which it is attached.

In this regard, two inch buckles would typically be paired with a two inch by two inch strap. Other attachment portions may include threaded elements, or alternatively, snaps, hook and eye, and/or VELCRO® attachment systems.

Figure 4:
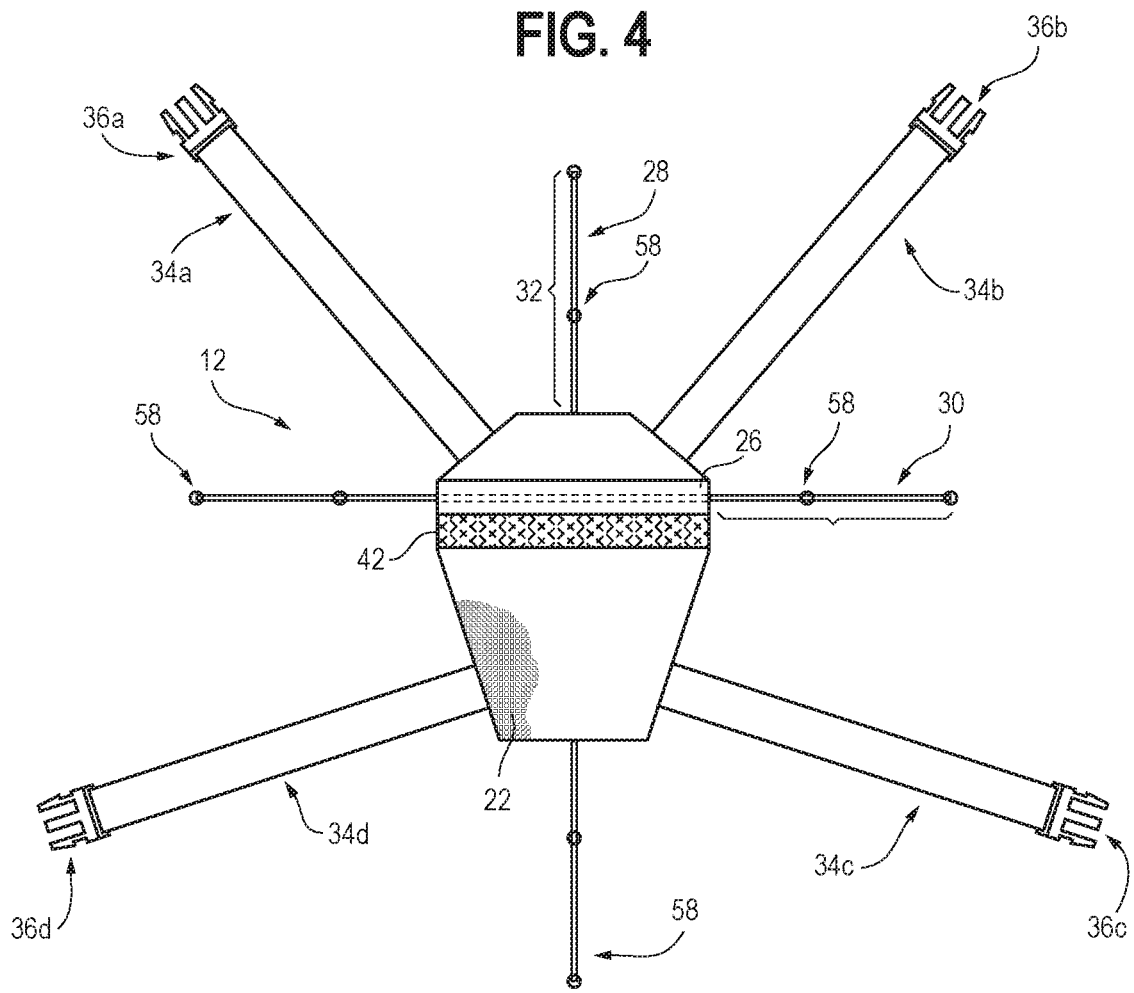
FIG. 4 is an exemplary view of an outside of the back panel of the vest of FIG. 3.

FIG. 4 illustrates an embodiment of an outside view of an exemplary back panel 12 (the side of the back panel that is distal to the athlete's back) of the present disclosure. Perpendicular rods 28 and 30 are shown disposed through horizontal passageway 26 and vertical passageway 24 (not shown), exposing each rod at both of its ends 32 so that they are within the peripheral vision of the user. In addition, FIG. 4 illustrates the four straps 34(*a-d*) discussed hereinabove for FIG. 3. Each of the straps attached to the back panel 12 includes a clip portion 36(*a-d*) that corresponds to a clip portion 38(*a-d*) on one of the straps 40(*a-d*) attached to the chest panel 14. FIG. 4 also includes an optional attachment strip 42 for attaching a pouch 44 to the training vest. The training vest may employ one or two optional pouches 44. Such pouches may be designed, inter alia, to assist in maintaining connectivity between the athlete's upper arm(s) and torso during swing or other rotational movements.

In certain embodiments, an included feature of the training vest 10 is a chest panel 14 in proximity to the athlete's chest area that assists in establishing and properly maintaining the initial positioning of the training vests, the chest panel 14 working in conjunction with elastomeric straps 40(*a-d*) to account for body flex during swing or other rotational movement, to assist the wearer in identifying modifications to the movement that maintain proper and consistent positioning of the training vest throughout swing or other rotational movement. The sizes of the chest panel and back panel may vary, and should not adversely impact the intended use of the training vest. In some embodiments, the chest panel has at least two forms of symmetry (e.g., vertical and horizontal symmetry), for example, a square, a pentagon, a hexagon, a heptagon, an octagon, or any other regular or geometric symmetrical polygon. In other embodiments, chest panel or back panel is circular or oval.

Figure 9C:
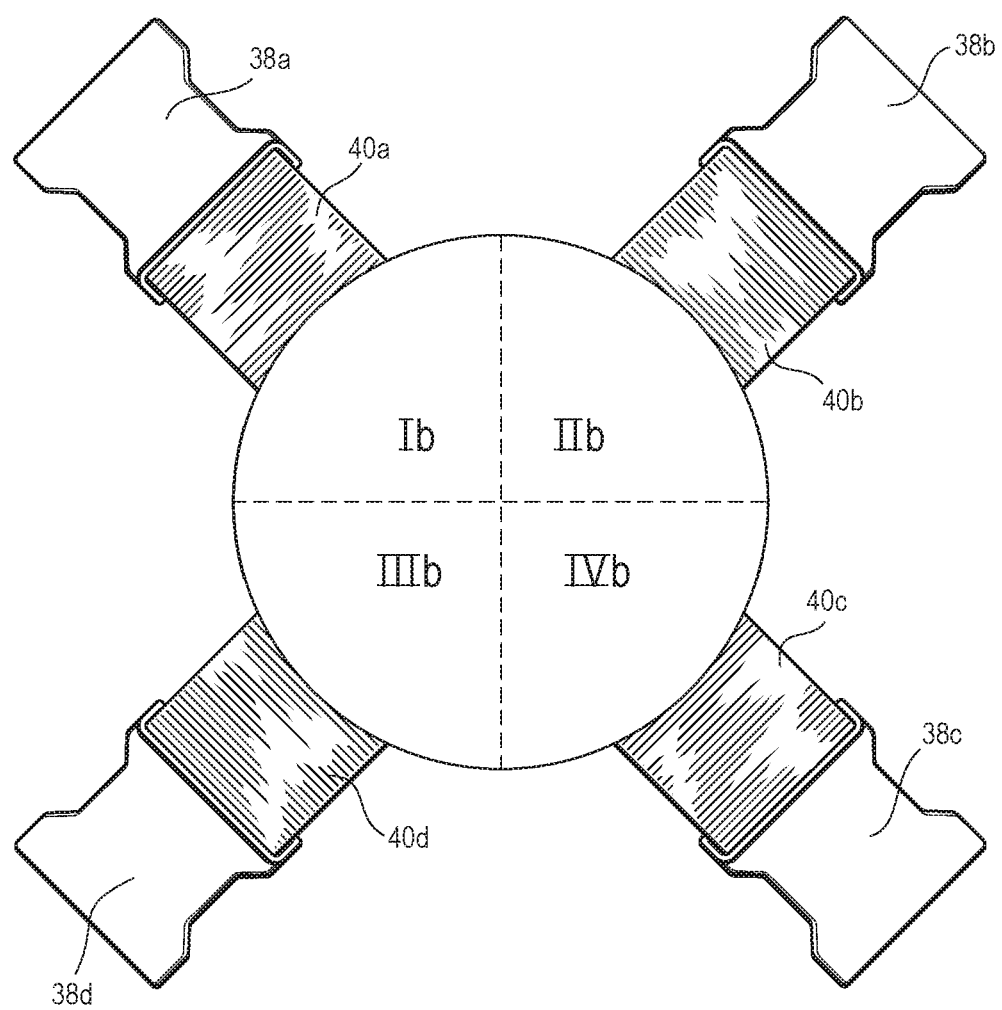
FIG. 9c is a front view of the chest panel of FIG. 9b.
Figure 10:
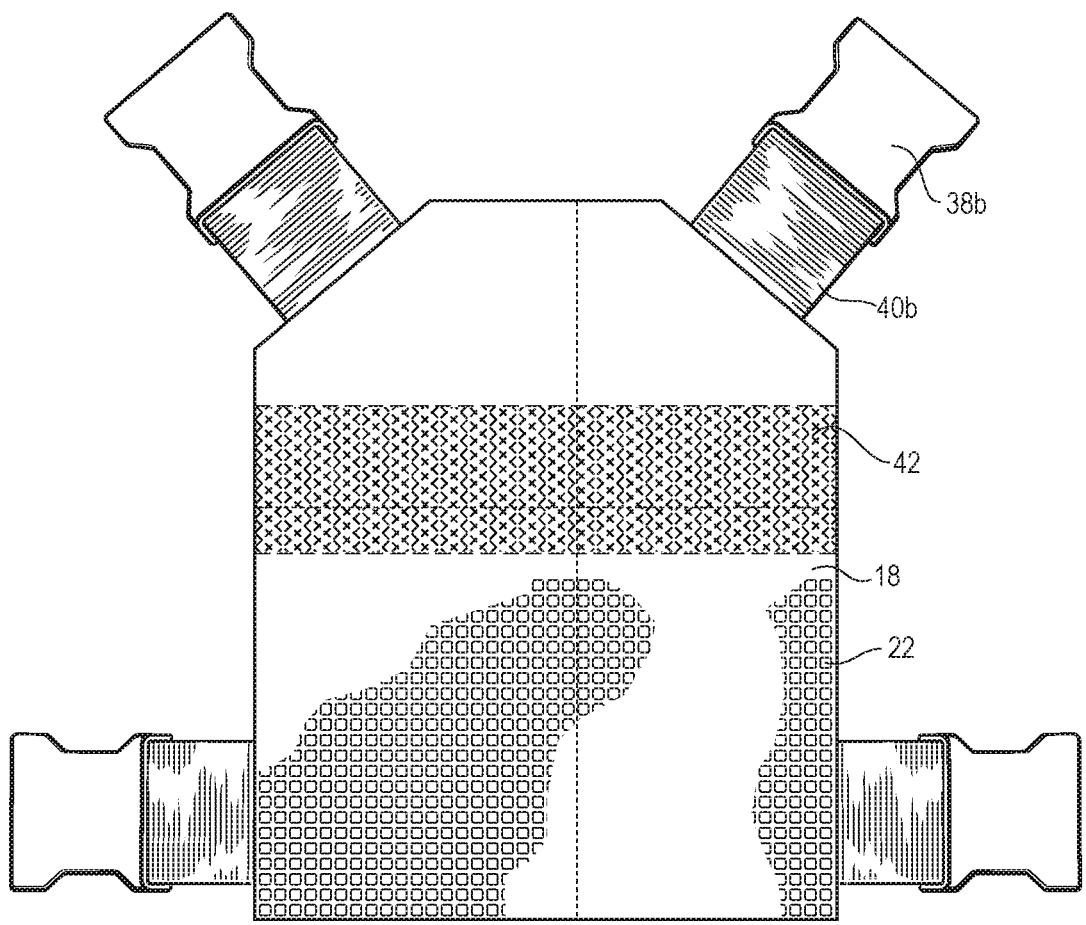
FIG. 10 illustrates a chest panel of a vest of another presently disclosed posture training system.

In still other embodiments, chest panel or back panel may have one form of symmetry (e.g., vertical symmetry only) or may be non-symmetrical, such as that illustrated in FIG. 10. In certain embodiments, the chest panel straps are attached to the chest panel such that they form two opposing pairs of straps (see FIG. 5 and FIG. 9*c*). In other embodiments, one strap (of 40*a*, 40*b*, 40*c*, and 40*d*) is attached at a chest panel location within each of the four areas (Ib, IIb, IIIb, and IVb), respectively. See FIG. 9*c* and FIG. 10. In certain other embodiments, the chest panel is symmetrical and one strap (of 40*a*, 40*b*, 40*c*, and 40*d*) is attached at a chest panel location within each of the four areas (Ib, IIb, IIIb, and IVb), respectively.

Figure 5:
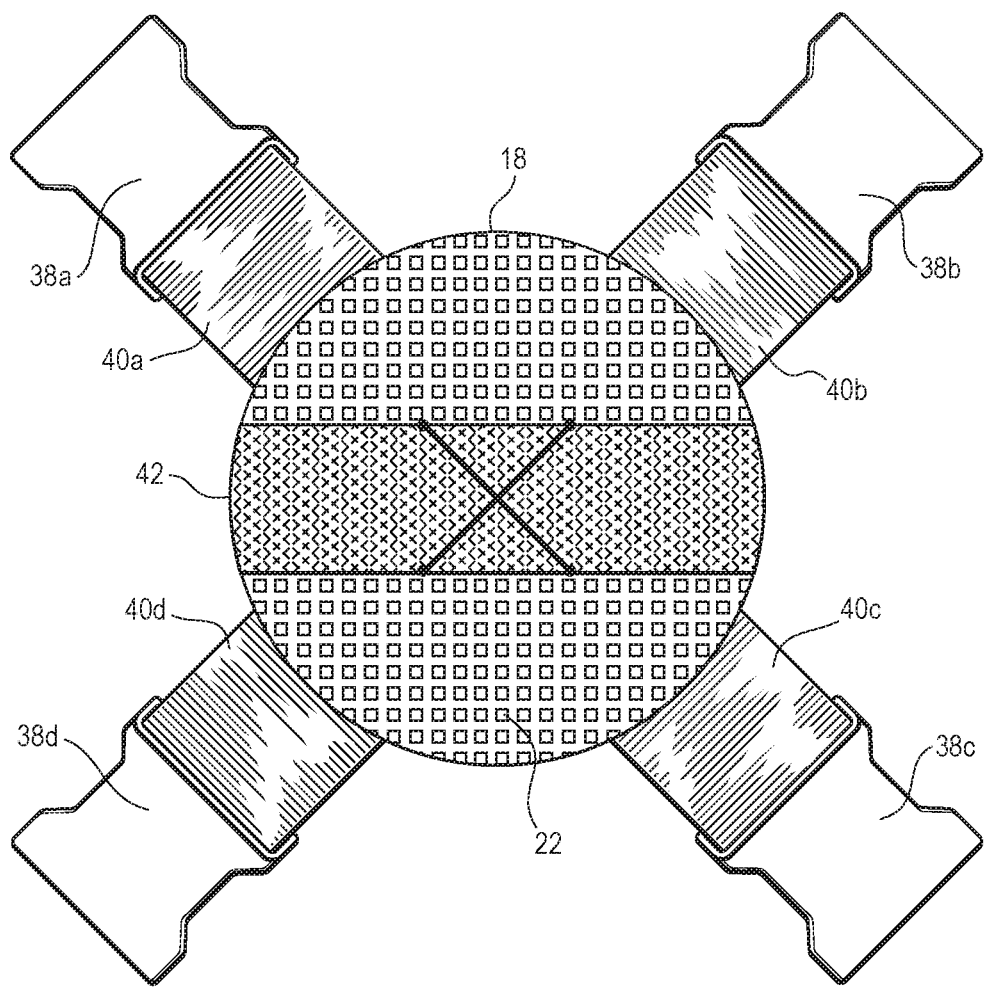
FIG. 5 is an exemplary view of an outside of a chest panel of a vest of a presently disclosed posture training system.

FIG. 5 illustrates an embodiment of an exemplary chest panel 14 of the present disclosure having four elastic straps 40(*a-d*) disposed radially about the chest panel. These are typically positioned to interconnect with corresponding adjustable straps 34(*a-d*) attached to the back panel 12. The chest panel 14 is typically constructed of materials similar to those employed in constructing the back panel 12, such as the outer layers (16, 18) and insert 20 herein disclosed.

Figure 6:
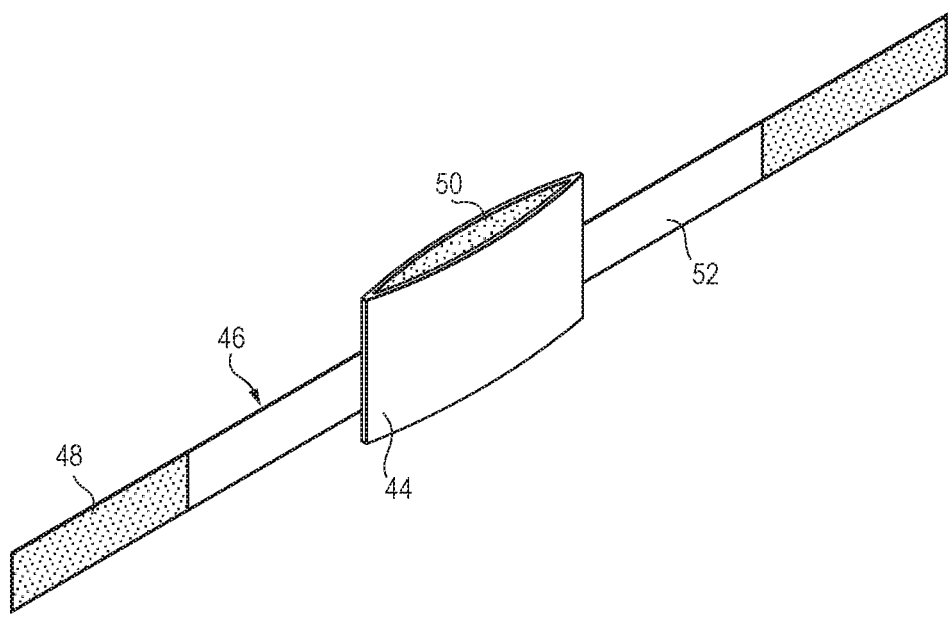
FIG. 6 is perspective view of an exemplary embodiment of a connectivity pouch of a presently disclosed posture training system.

FIG. 6 illustrates an exemplary pouch 44 for holding one or more of a range of compression sponges (hidden from view) of varying thicknesses and/or densities. The pouch generally includes a strap with two attachable ends, one end capable of attaching to the back panel and the other end to the chest panel. Exemplary attachment devices include hook and loop systems such as VELCRO® attachments, snaps and other known attachment systems wherein the corresponding portion for a particular pouch strap is positioned on the first or chest panel. Attaching the pouch to the back panel and chest panel positions the pouch between an upper arm and torso, or in the case where two pouches are employed, on both sides of the athlete's torso. The pouch may be constructed of materials similar to those described in this application for the outer layers in the manufacture of the first or chest panel. The dimensions of the pouch may vary. An exemplary pouch may be about 4 inches to about 6 inches tall by about 6 inches to about 8 inches wide. While the pouch may be open ended, or flapped to retain any moiety placed therein, it may further include a zipper, snap, VELCRO® attachment or other reversible closure 50 to assist in retain any inserted moiety, such as a sponge or pad measuring about one inch to about six inches wide. The strap or straps associated with the pouch for attachment to the back panel and chest panel may comprise, an elastic portion 46 and/or 52 to facilitate fitting to the individual wearer for size and comfort.

The rods (28, 30) are typically linear, single-piece construction, and somewhat rigid. Aluminum, wood, or plastic rods such as those presently used in golf swing training are acceptable. The rods should be rigid enough, so that the training vest wearer's spine does not substantially curve or bend the rod in use. The particular material of construction elected for manufacture of the training vests and rod dimensions associated with the material should allow the rod to have these characteristics. The diameter and/or length of a rod may vary. In a non-limiting embodiment, the rod has a diameter of about ¼". The length of the vertical rod 28 may vary, but may range from about one foot to about five feet, e.g., about two feet, three feet, four feet, or any other value in that range. The length of the vertical rod 28 should be long enough that at least one terminal end protrudes from at least one side of the vertical passageway 24. In some embodiments, the vertical rod 28 should be long enough such that a user wearing the vest 10 can see a terminal end while wearing the vest 10. Likewise, the length of the horizontal rod 30 may vary, but may range from about one foot to about five feet, e.g., about two feet, three feet, four feet, or any other value in that range. The length of the horizontal rod 30 should be long enough that its terminal ends protrude from at least one side of the horizontal passageway 26. In order for any rod to be readily visualized during use, its ends should extend outward from the back panel. For example, horizontal rods should extend beyond the shoulders to be readily observable within a user's peripheral vision during portions of the rotational movement. For example, the horizontal rod 30 may be sized such that it extends away from each side of the vertical axis of the back panel by at least twelve inches, e.g., eighteen inches, two feet, or thirty-six inches. Vertical rods should extend sufficiently beyond the back panel to be observable to an observer, such as a trainer or coach.

Figure 7A:
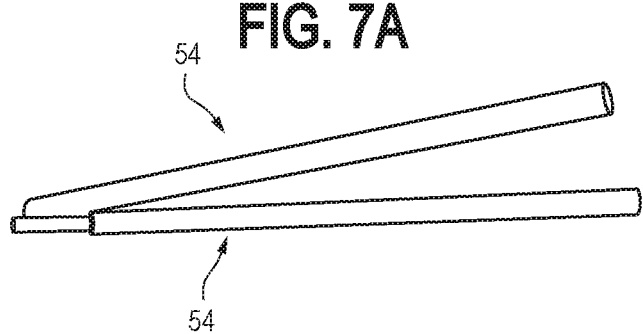
FIG. 7a shows a sectioned and/or shock-corded rod suitable for use with a presently disclosed posture training system.
Figure 7B:
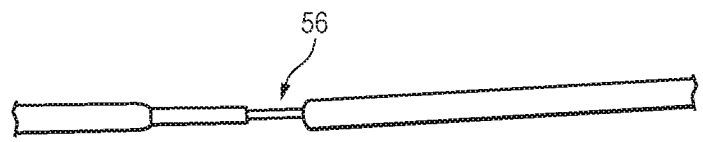
Figure 7C:
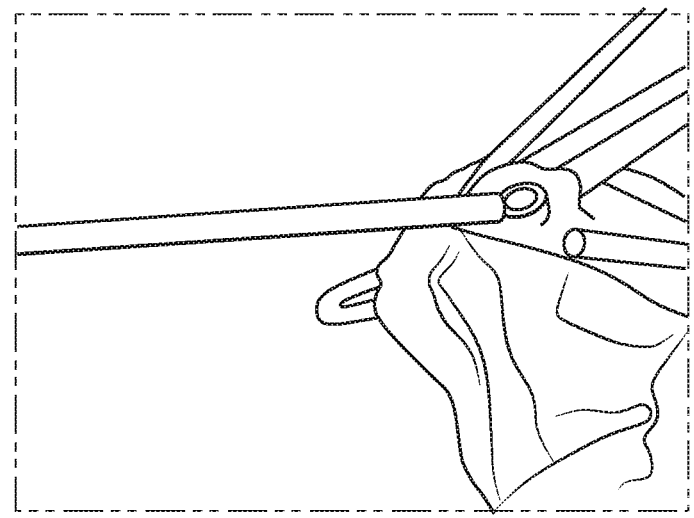

While the rods may be of single piece construction, alternatively, they may be designed to be sectionalized (54), telescopically or otherwise, and optionally internally shock-corded (56), to facilitate ready assembly and allow compact storage when not in use, such as Helinox rods and or collapsible tent poles (see FIGS. 7A-7C). Any of the disclosed rods may further include tracking sensors 58 at various points along any one or both of the rods, including at one or more of a rod's termini. The opposing termini of each rod are unrestrained with respect to the wearer of the disclosed training vest, being held proximate to the back panel, and indirectly to a wearer, by their placement through one of the two passageways. In certain embodiments, the rods have a fixed overall length. In these embodiments, rods of a different length may be employed in the training vests to optimize training vest performance relative to the wearer's physical size in a vertical or horizontal direction, or both.

As shown in FIGS. 3-4, the vest 10 may include one or more of sensors 58, including more than one type of sensor 58. Exemplary sensors 58 include: locational sensors (such as radiofrequency identification devices (RFID), inertial measurement units (IMUs), accelerometers, gyroscopes, magnetometers), visual sensors (such as photo diodes, light emitting training vests and light emitting diodes), and computer assisted tracking training vests, any of which may be wireless and/or power cordless. It is expressly contemplated that any of sensors 58 may be configured to transmit information or signals (such as before, during, and/or after a user's swing) to an onboard computer, a remote computer, and/or computer-based swing evaluation systems, including video systems, virtual reality systems, and augmented reality systems. In an embodiment, the system may be a kit that includes the vest 10 (including the one or more sensors 58) and software that is configured to operate on a remote computer. In an embodiment, the vest 10 may include additional hardware and software that enable connectivity, such as with video based systems and/or augmented reality or virtual reality systems. In an embodiment, the system is a video based system, an augmented reality, or virtual reality system that includes the vest and any of the elements and functionality described herein.

Figure 12:
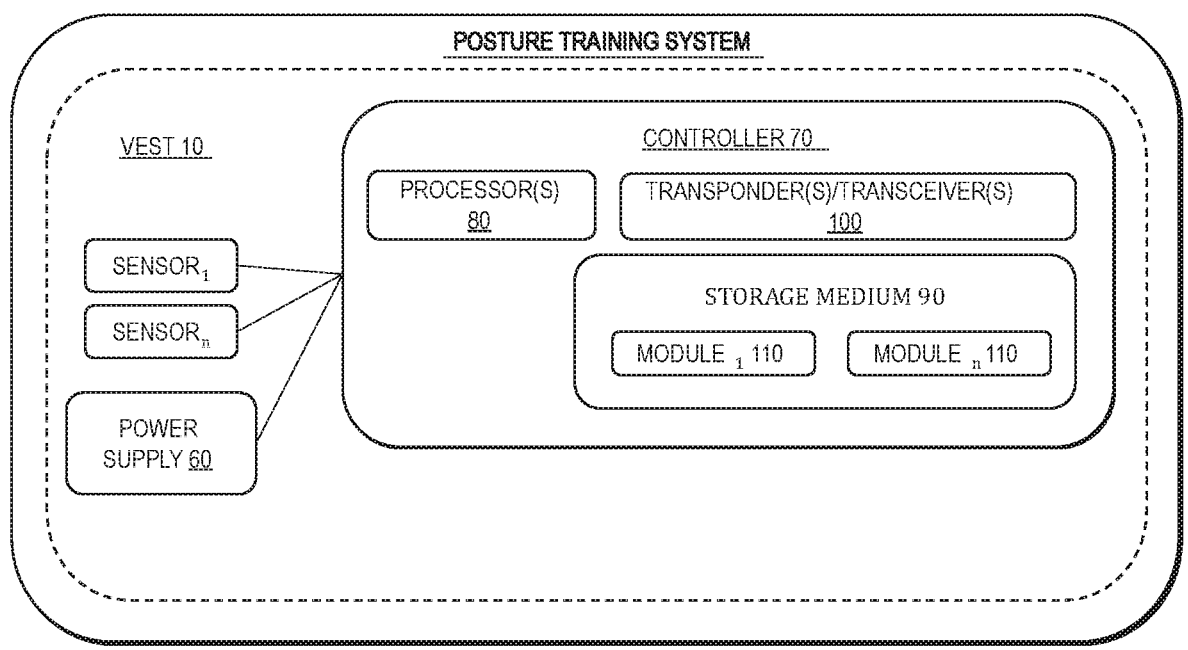
FIG. 12 schematically illustrates elements of an exemplary posture training system.

As shown in the non-limiting embodiment of FIG. 12, the system may include and may be operatively connected with a power supply 60 (e.g., a battery or an electrical grid) and a controller 70, the controller 70 including one or more processors 80, a computer-readable storage medium 90, and one or more transceivers and/or transponders 100. In FIG. 12, all of the foregoing elements are located on the vest 10. In an embodiment, any subset of the foregoing elements may be located on the vest 10 (e.g., the sensors 58 and power supply 60), and any subset may be located apart from the vest 10, but still as part of the system (e.g., software that is intended for installation on a remote computer). In an embodiment, the controller may be remote from the vest 10, e.g., on a remote computer.

Referring still to FIG. 12, the computer-readable storage medium 90 may include one or more modules 110 (each module may be implemented as software logic, firmware logic, hardware logic, and various combinations thereof). Each module 110 may be configured to compute one or more of the following parameters: a first shoulder position relative to a ground plane, the first shoulder position relative to a second shoulder position, the first shoulder position relative to a spine position, a spine tilt angle relative to the ground plane, a spine alignment, an angle between a shoulder axis and a spine axis, a torso rotation rate, a position of the shoulder axis during torso rotation, and a plane during rotation with respect to the longitudinal axis of the wearer's spine.

In an embodiment, the information and signals that may be transmitted by the system (such as from one or more sensors 58, transponders, and/or transceivers that are located on the vest 10) may include raw data sensed by one or more sensors 58, and/or data that is sufficient to calculate: a first shoulder position relative to a ground plane; the first shoulder position relative to a second shoulder position; the first shoulder position relative to a spine position; a spine tilt angle relative to the ground plane; a spine alignment; an angle between a shoulder axis and a spine axis; and a torso rotation rate. Thus, in an embodiment, the system itself need not compute or analyze data, but may provide to another system data that is sufficient to compute the foregoing parameters. Thus, the system may periodically or continually transmit a data set containing a plurality of useful data, including any of the above mentioned data. The data may be received by the remote computer and/or computer-based swing evaluation system (e.g., video system, virtual reality system, and augmented reality system), where it may be utilized and/or processed further to provide useful feedback to the user, such as a visualization of the user's swing.

Methods of using the posture training systems described herein may include any of the following steps: providing a posture training system (including a vest); instructing a user to don the vest; instructing the user wearing the vest to establish an initial position (e.g., addressing a golf ball); donning the vest; instructing the user to carry out a physical movement involving the torso (e.g., a golf swing); carrying out the physical movement; observing, capturing, and/or sensing (e.g., with visual observation, a camera, and/or a sensor 58) one or more parameters before, during, and/or after the physical movement (e.g., a left shoulder position relative to a ground plane; the left shoulder position relative to a right shoulder position; the left shoulder position relative to a spine position; a spine tilt angle relative to the ground plane; a spine alignment; an angle between a shoulder axis and a spine axis; and a torso rotation rate); instructing the user based upon the observed/captured/sensed parameters; and adjusting the physical movement based upon at least one of the observed/captured/sensed parameters. The methods may also include utilizing one or more sensors 58 and other hardware described herein to measure, and/or compute one or more of the foregoing parameters, e.g., in a time series. The methods may additionally or alternatively include using utilizing one or more sensors 58 and other hardware described herein to transmit any one or more of the foregoing parameters or raw sensor data, to a remote system, such as a computer and/or video swing evaluation system, virtual reality system, and augmented reality system, including systems that utilize video and motion cameras. The methods may additionally or alternatively include observing, capturing, sensing, and/or generating a notification (e.g., a signal transmitted to a remote system, or an audible or visible alert creating by a light or an alarm) when any of the foregoing parameters deviate from a predetermined threshold.

In a non-limiting embodiment, a method of using a posture training system includes: providing the posture training system to a user; executing a physical movement involving a torso of the user; and using at least one sensor 58 (e.g., on the vest) to sense a first parameter (e.g., a location of the first rod). The method may further include using at least one other sensor 58 (e.g., on the vest) to sense a second parameter (e.g., a location of the second rod). The method may further include transmitting at least one parameter to a remote system (e.g., a computer and/or video swing evaluation system, virtual reality system, and augmented reality system). The method may further include computing a third parameter (including any of the parameters discussed above) based on the first and/or second parameter.

Figure 1:
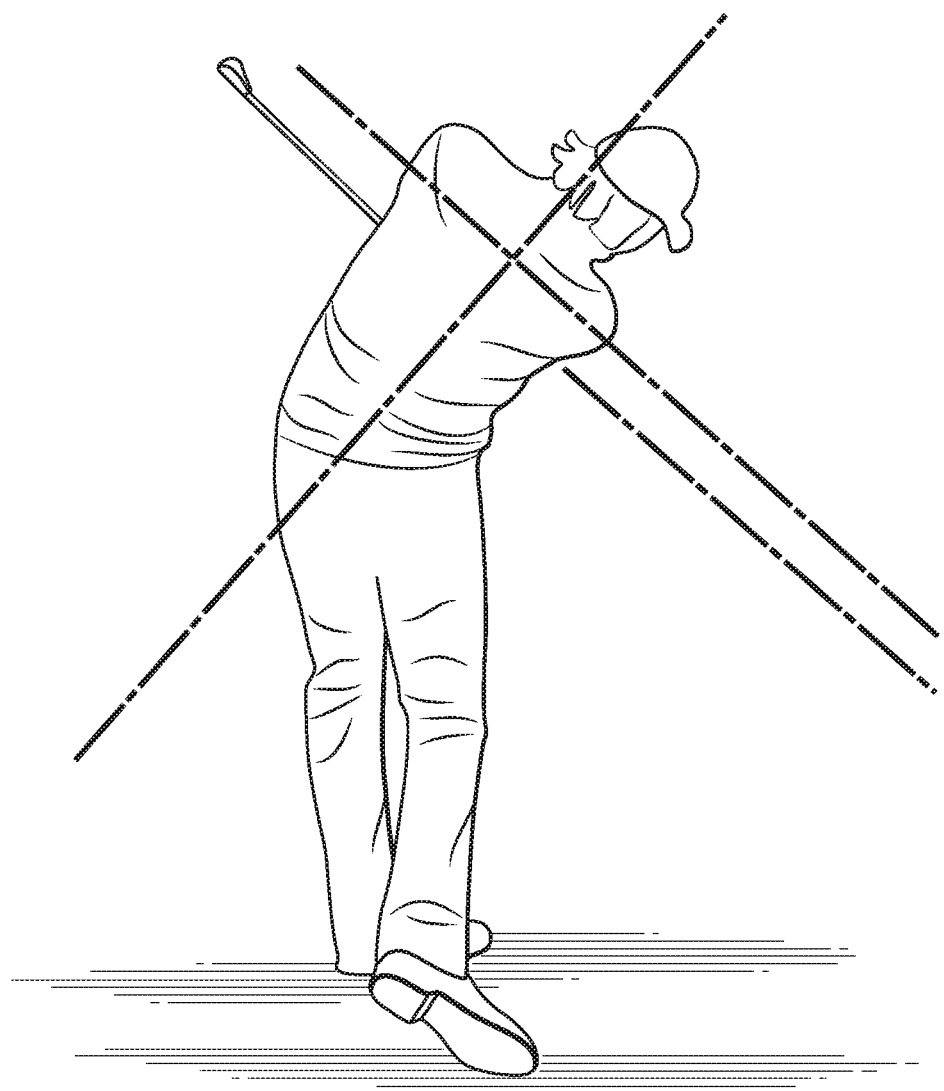
FIG. 1 illustrates a golfer during his swing with an inserted series of lines depicting the perpendicular relationship between spine and shoulders.
Figure 8:
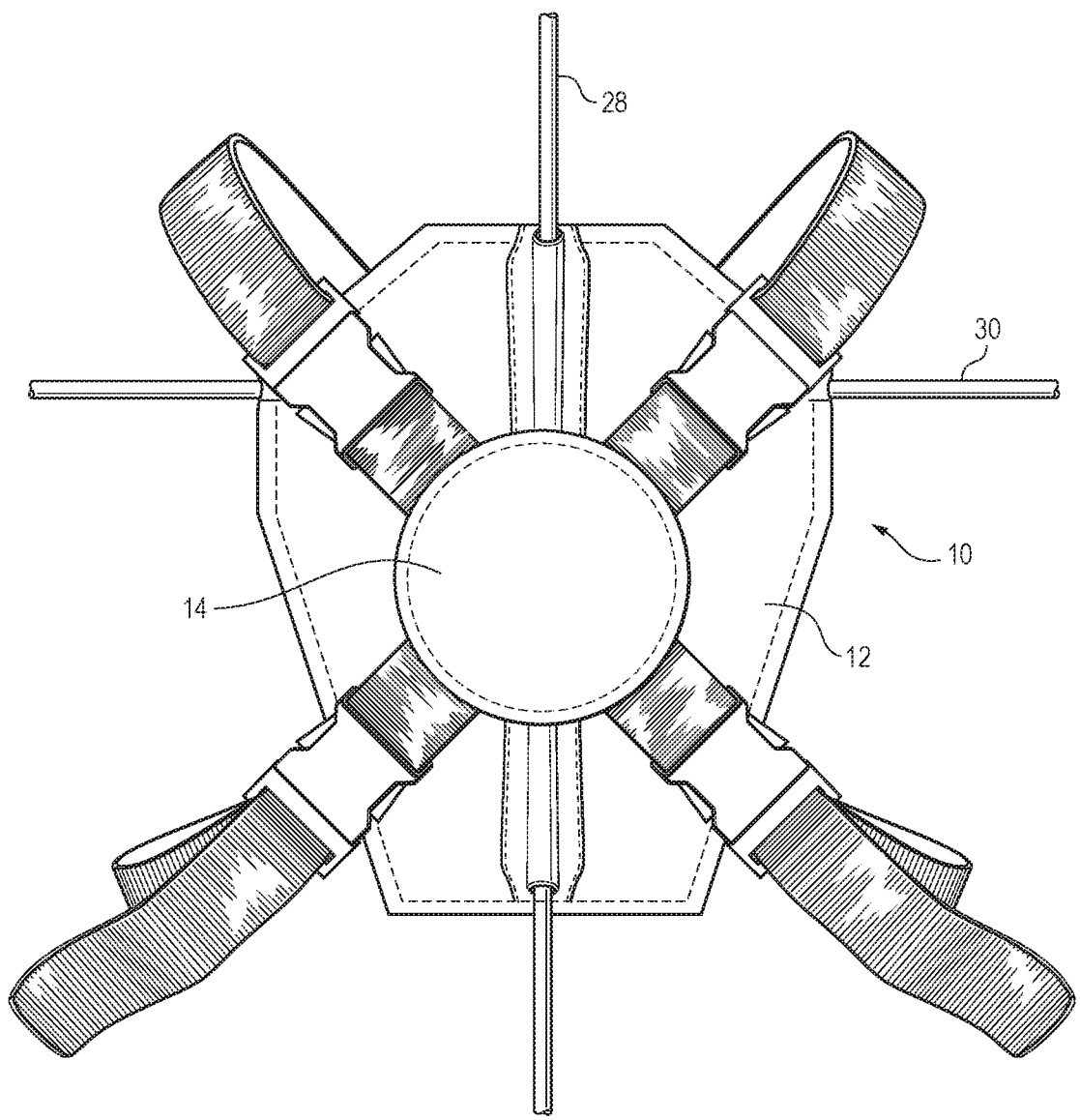
FIG. 8 is a front view of an exemplary embodiment of a vest of a presently disclosed posture training system.
Figure 9A:
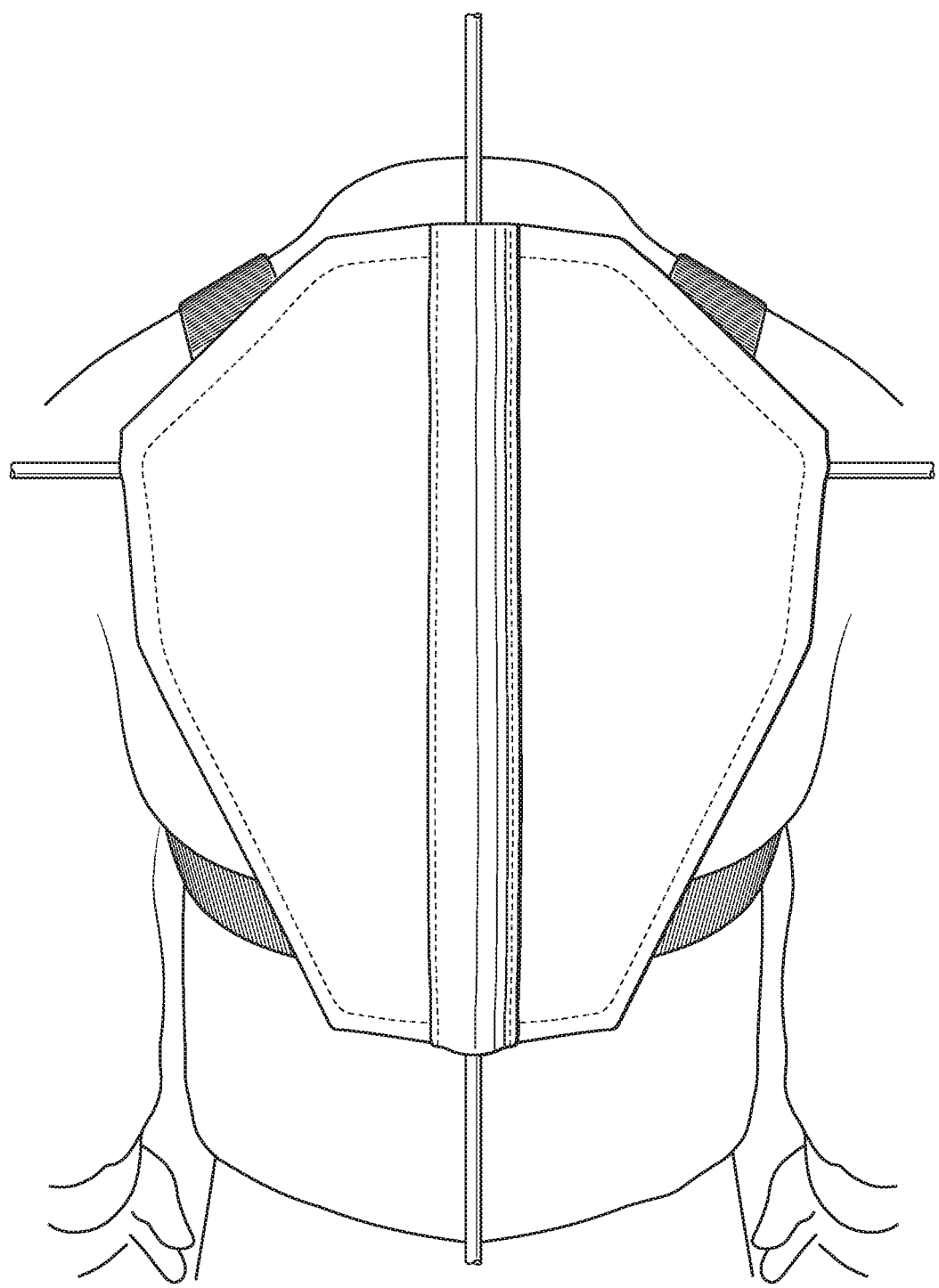
FIG. 9a illustrates a rear view of a golfer donning a vest of the presently disclosed posture training system.
Figure 9B:
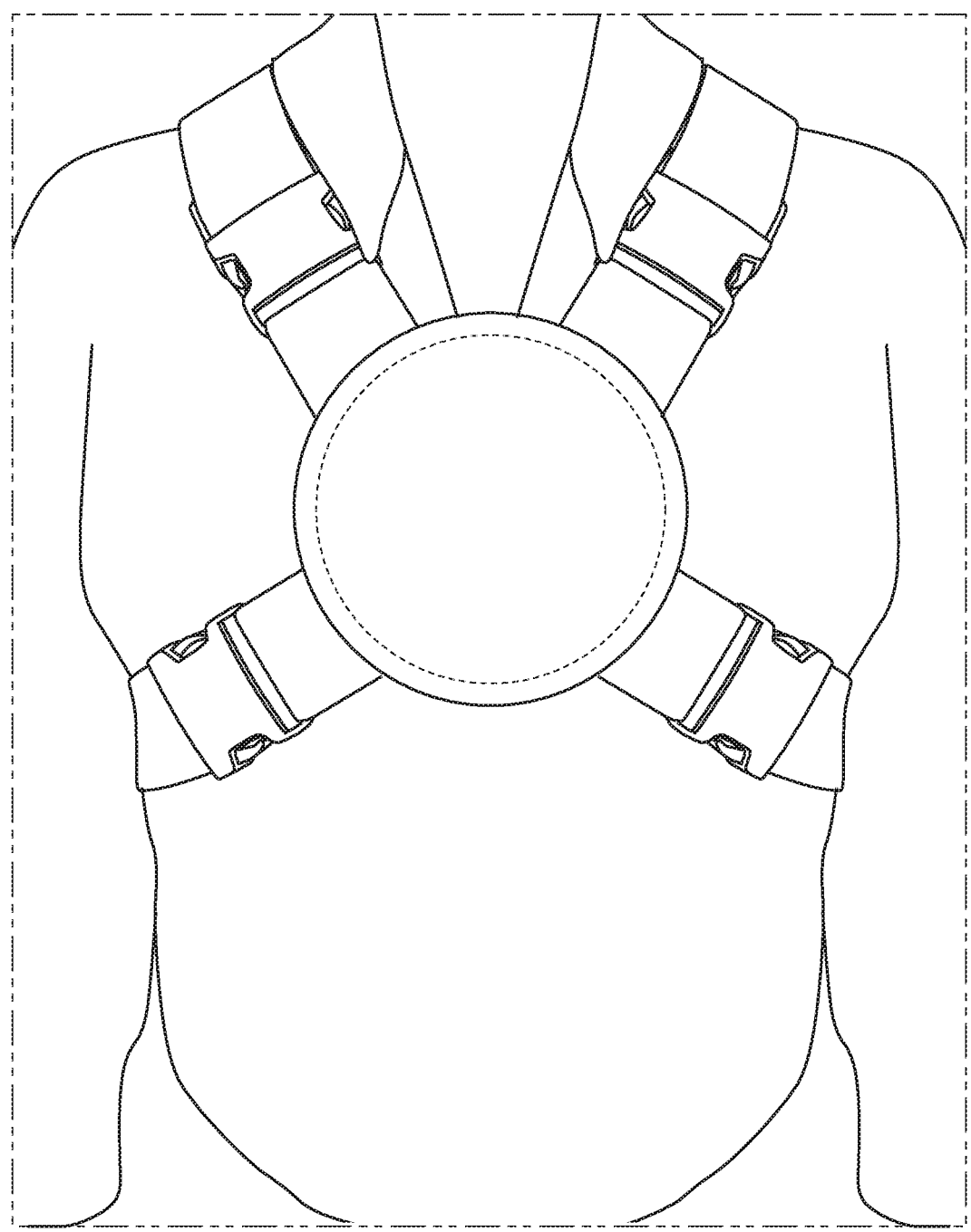
FIG. 9b is a view of a chest panel of the vest of FIG. 9a as worn by a golfer.

Various additional illustrations provide front, back and perspective views of an embodiment of the present disclosure, illustrating a useful exemplary construction of the training vest and typical placement of rods extending through each of the passageways (see FIGS. 8, 9*a*). FIG. 9*a* and FIG. 9*b* illustrate positioning of the training vest on a typical athlete. FIG. 9*a* and FIG. 9*c* illustrate aspects of the chest panel in use and/or when unattached to the back panel through the four sets of straps 34(*a-d*) and 40 (*a-d*). FIG. 1 shows a golfer during his swing with illustrative lines added to depict the perpendicular relationship between spine and shoulders.

Figure 11:
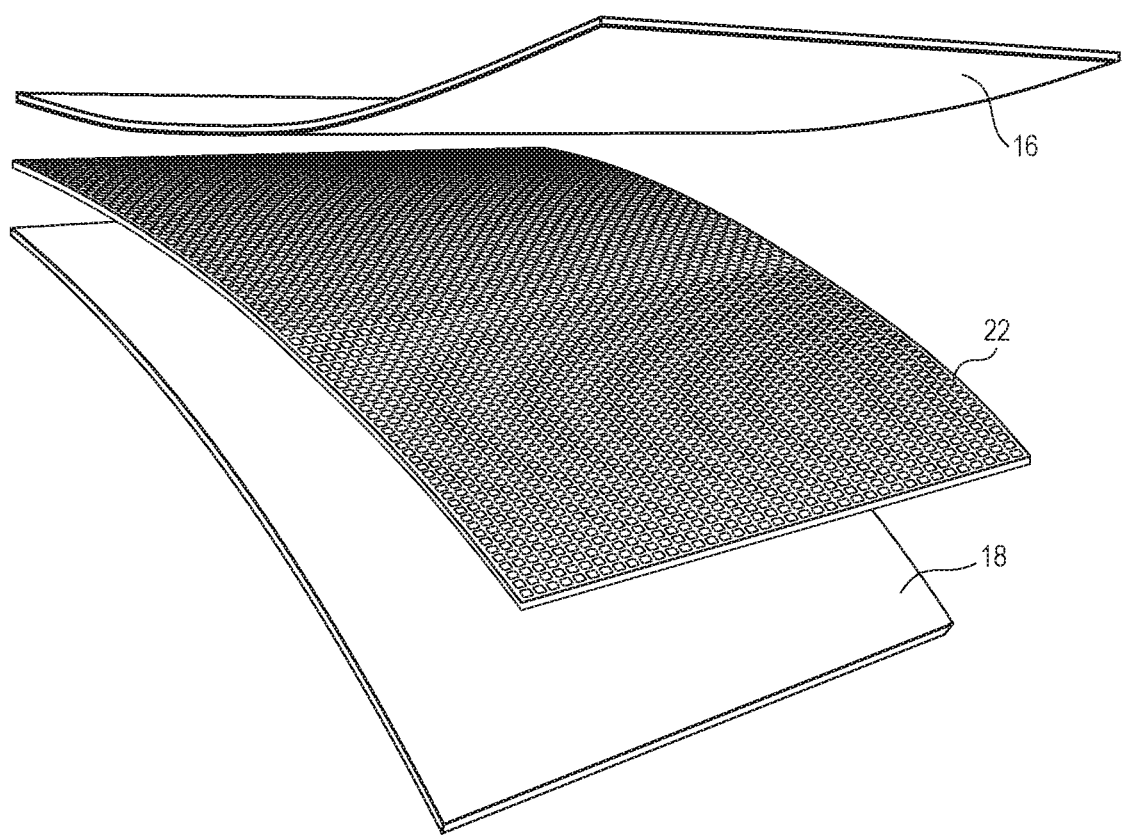
FIG. 11 illustrates a view of a fabrication of an exemplary partial back panel or partial chest panel showing a plastic mesh insert and two outer layers.

FIG. 10 is illustrative of an exemplary non-symmetrical chest panel 12 (the side of the back panel that is distal to the athlete's back) of the presently disclosed training vest 10, wherein the chest panel includes four straps 34(*a-d*), one each of the four straps that is attached at a chest panel location within each of the four areas (Ib, IIb, IIIb, and IVb), respectively. The chest panel illustration also depicts an insert 20 constructed of plastic mesh 22, one of the two nylon outer layers 18 and an optional VELCRO® strip 42 for attaching one or two connectivity pouches 44 as described herein. FIG. 11 is illustrative of an exploded view of a fabrication portion for an exemplary back panel 12 or chest panel 14 of the presently disclosed training vest 10, showing three-layer construction including two outer layers (16, 18) and an insert (shown as rigid plastic mesh 22).

Other embodiments of the disclosure are directed to methods of use of the disclosed training vests to correct or improve posture and alignment of the shoulders of an athlete during physical movements in sports or other related activities. These methods include: providing the disclosed training vest or system including the training vest, positioning the training vest on an athlete, having the athlete wearing the training vest establish an initial position for analyzing the physical movement, and thereafter conducting the physical movement.

In certain other embodiments, the disclosure is directed to methods of use to correct or improve posture and alignment of the shoulders of an athlete during physical movements in sports or other related activities that include providing the disclosed training vest or system including the training vest, positioning the training vest on an athlete, having the athlete wearing the training vest establish an initial position for analyzing the physical movement, and thereafter conducting the physical movement while visualizing the movement.

In some embodiments, the methods further comprise analyzing certain parameters including: spine-tilt angle relative to the ground, the plane of the shoulders during torso rotation (or maintenance thereof), the plane during rotation with respect to the longitudinal axis of the wearer's spine (or the corresponding vertical rod of the training vest), and maintenance of perpendicularity between the spine and a line drawn between the shoulders (or shoulder blades). These methods of analysis may include direct visual observation by the wearer or other interested observer such as a coach; indirect visual observation by visual recording and concurrent or later review of the movement's recording, or from data supplied by tracking sensors and analyzed or quantified by any of a number more recently developed computer and/or video swing evaluation systems.

In yet other embodiments, the methods further include adjustments to the physical movement based on the visualized parameters relative to certain pre-established parameters, and thereafter performing the adjusted physical movement. In still other embodiments, these processes may be carried reiteratively, by optionally visualizing, analyzing performance of the visualized parameters and modifying the movement as required in a repetitive process.

In certain embodiments, these procedures may define methods for creating muscle memory or feel of the correct posture for consistently repeating an optimized physical movement in the later absence of the training vests.

The descriptions set forth above are meant to be illustrative and not limiting. Those skilled in the art will appreciate that numerous changes and modifications can be made to the embodiments of the present disclosure and that such changes and modifications can be made without departing from the spirit of the disclosure. For example, artisans will understand how to implement the embodiments in many other ways, using equivalents and alternatives that do not depart from the scope of the disclosure. Moreover, unless indicated to the contrary in the preceding description, none of the components described in the implementations are essential to the embodiments disclosed. It is thus intended that the embodiments be considered as illustrative, with a true scope and spirit of the disclosure being indicated by the following claims.

The embodiments of the invention in which an exclusive property or privilege is claimed are defined as follows:

1. A golf posture training system, comprising:
   a vest comprising:
      a back panel comprising a first passageway extending along a vertical axis of the back panel and a second passageway extending along a horizontal axis of the back panel, wherein the first passageway is perpendicular to the second passageway, wherein the back panel has a first surface area and attaches to a plurality of at least four straps;
      a chest panel configured to attach to the plurality of at least four straps, wherein the chest panel has a second surface area which is smaller than the first surface area;
      a first rod extending at least partially through the first passageway and projecting outwardly therefrom; and
      a second rod extending at least partially through the second passageway and projecting outwardly therefrom, wherein first and second ends of the second rod extend outward from the back panel, wherein the first passageway and the second passageway respectively hold the first rod and the second rod in a perpendicular relationship; and
   a plurality of sensors, each sensor of the plurality of sensors being located on one of the first rod or the second rod.

2. The golf posture training system according to claim 1, wherein the plurality of at least four straps consists of four straps.

3. The golf posture training system according to claim 1, wherein the plurality of at least four straps includes two shoulder straps and two torso straps.

4. The golf posture training system according to claim 3, wherein the first passageway and the second passageway are sewn into the back panel.

5. The golf posture training system according to claim 1, wherein the back panel includes two outer layers and an insert disposed between the two outer layers, wherein the insert is constructed of plastic mesh.

6. The golf posture training system according to claim 1, wherein each strap of the plurality of at least four straps is elastomeric and attached to the chest panel such that the plurality of at least four straps forms two opposing pairs of elastomeric straps on the chest panel.

7. The golf posture training system according to claim 1, wherein at least one strap of the plurality of at least four straps is independently attachable to the chest panel and adjustably sizeable.

8. The golf posture training system according to claim 1, further comprising a pouch that is connectable to the back panel and the chest panel.

9. The golf posture training system according to claim 1, wherein the second rod extends completely through the second passageway and projects outwardly from each side of the vertical axis of the back panel by at least twelve inches.

10. The golf posture training system according to claim 1, wherein at least a first sensor of the plurality of sensors is located on the first rod and at least a second sensor of the plurality of sensors is located on the second rod.

11. The golf posture training system according to claim 1, wherein at least a first sensor and a second sensor of the plurality of sensors are both located on the first rod or the second rod.

12. The golf posture training system according to claim 1, wherein at least one sensor of the plurality of sensors is configured to sense at least one information type selected from the group consisting of: a shoulder position, a shoulder tilt angle, a spine position, a spine tilt angle, and a spine alignment.

13. The golf posture training system according to claim 1, wherein the plurality of sensors is configured to transmit data sufficient to calculate at least one information type selected from the group consisting of: a first shoulder position relative to a ground plane, the first shoulder position relative to a second shoulder position, the first shoulder position relative to a spine position, a spine tilt angle relative to the ground plane, a spine alignment, an angle between a shoulder axis and a spine axis, and a torso rotation rate.

14. The golf training system according to claim 1, further comprising a computer readable storage medium storing one or more logic modules configured to compute, based on data from the plurality of sensors, at least one information type selected from the group consisting of: a first shoulder position relative to a ground plane, the first shoulder position relative to a second shoulder position, the first shoulder position relative to a spine position, a spine tilt angle relative to the ground plane, a spine alignment, an angle between a shoulder axis and a spine axis, a torso rotation rate, a position of the shoulder axis during torso rotation, and a plane during rotation with respect to the vertical axis.

15. The golf training system according to claim 1, further comprising a controller located on the vest and operably connected to the plurality of sensors, the controller having a processor and a computer readable storage medium storing one or more modules configured to compute at least one information type selected from the group consisting of: a first shoulder position relative to a ground plane, the first shoulder position relative to a second shoulder position, the first shoulder position relative to a spine position, a spine tilt angle relative to the ground plane, a spine alignment, an angle between a shoulder axis and a spine axis, a torso rotation rate, a position of the shoulder axis during torso rotation, and a plane during rotation with respect to the vertical axis.

* * * * *